United States Patent
Zhu

(10) Patent No.: US 9,762,359 B2
(45) Date of Patent: Sep. 12, 2017

(54) E-HICH INFORMATION TRANSMITTING METHOD, BASE STATION AND USER EQUIPMENT

(71) Applicant: Telefonaktiebolaget L M Ericsson (publ), Stockholm (SE)

(72) Inventor: Guowei Zhu, Nanjing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 103 days.

(21) Appl. No.: 14/760,255

(22) PCT Filed: Jan. 10, 2013

(86) PCT No.: PCT/CN2013/070305
§ 371 (c)(1),
(2) Date: Jul. 10, 2015

(87) PCT Pub. No.: WO2014/107862
PCT Pub. Date: Jul. 17, 2014

(65) Prior Publication Data
US 2015/0365199 A1    Dec. 17, 2015

(51) Int. Cl.
*H04W 4/00* (2009.01)
*H04L 1/18* (2006.01)
*H04W 72/04* (2009.01)

(52) U.S. Cl.
CPC ............. *H04L 1/1887* (2013.01); *H04L 1/18* (2013.01); *H04L 1/1854* (2013.01); *H04W 72/0413* (2013.01)

(58) Field of Classification Search
CPC ....... H04L 1/1887; H04L 1/18; H04L 1/1854; H04W 72/0413
See application file for complete search history.

(56) References Cited

U.S. PATENT DOCUMENTS

2001/0048380 A1* 12/2001 Medlock ................. G06F 7/584
                                                    341/50
2007/0150497 A1*  6/2007 De La Cruz ........ H03M 7/3084
(Continued)

FOREIGN PATENT DOCUMENTS

CN         101174878 A      5/2008
CN         101388758 A      3/2009
(Continued)

OTHER PUBLICATIONS

Extended European Search Report for Application No. 13870651.0, dated Jul. 21, 2016, 6 pages.
(Continued)

*Primary Examiner* — Robert Wilson
(74) *Attorney, Agent, or Firm* — NDWE LLP

(57) ABSTRACT

There is provided a method, a user equipment and a base station that is capable of enhancing network throughput by efficiently transmitting E-DCH HARQ Acknowledgement Indicator Channel (E-HICH) information in the radio network. The method comprises combining previous E-HICH information with current E-HICH information when a transmission interval of the previous E-HICH information fully overlaps with a compressed mode gap, and transmitting the combined E-HICH information in a transmission interval of the current E-HICH information. The UE is configured to transmit uplink data even if it is determined that the E-HICH information of the uplink data will not be received before a next uplink transmission interval. Both the previous E-HICH information and the current E-HICH information will be received in the transmission interval of the current E-HICH information. Therefore, the network throughput is effectively enhanced.

11 Claims, 9 Drawing Sheets

(56) References Cited

U.S. PATENT DOCUMENTS

| | | | | |
|---|---|---|---|---|
| 2007/0253423 | A1* | 11/2007 | Chindapol | H04L 1/0041 370/394 |
| 2012/0054573 | A1* | 3/2012 | Kanemoto | H04L 1/1812 714/748 |
| 2015/0365199 | A1* | 12/2015 | Zhu | H04L 1/1854 370/329 |

FOREIGN PATENT DOCUMENTS

| | | | |
|---|---|---|---|
| CN | 101627655 | A | 1/2010 |
| CN | 101754273 | A | 6/2010 |
| CN | 102611538 | A | 6/2012 |
| EP | 1474898 | A1 | 11/2004 |
| WO | 2010062864 | A1 | 6/2010 |

OTHER PUBLICATIONS

PCT Notification of Transmittal of the International Search Report and the Written Opinion of the International Searching Authority for Counterpart PCT Application No. PCT/CN2013/070305 dated Oct. 17, 2013, 12 pages.

3GPP TS 25.211 v11.0.0: "Physical channels and mapping of transport channels onto physical channels (FDD)"; 3rd Generation Partnership Project; Technical Specification Group Radio Access Network; Release 11; Dec. 22, 2011; 60 pages.

3GPP TS 25.212 v11.4.0: "Multiplexing and channel coding (FDD)"; 3rd Generation Partnership Project; Technical Specification Group Radio Access Network; Release 11; Dec. 2012; 161 pages.

3GPP TS 25.213 v11.4.0: "Spreading and modulation (FDD)"; 3rd Generation Partnership Project; Technical Specification Group Radio Access Network; Release 11; Dec. 2012; 49 pages.

3GPP TS 25.214 v11.1.0: "Physical layer procedures (FDD)"; 3rd Generation Partnership Project; Technical Specification Group Radio Access Network; Release 11; Mar. 2012; 106 pages.

3GPP TS 25.215 v11.0.0: "Physical layer; Measurements (FDD)"; 3rd Generation Partnership Project; Technical Specification Group Radio Access Network; Release 11; Dec. 2011; 24 pages.

3GPP TS 25.321 v11.0.0: "Medium Access Control (MAC) protocol specification"; 3rd Generation Partnership Project; Technical Specification Group Radio Access Network; Release 11; Dec. 2011; 198 pages.

International Preliminary Report on Patentability, Application No. PCT/CN2013/070305, dated Jul. 14, 2015, 7 pages.

\* cited by examiner

E-HICH INFORMATION TRANSMITTING METHOD, BASE STATION AND USER EQUIPMENT

CROSS-REFERENCE TO RELATED APPLICATIONS

This application is a National stage of International Application No. PCT/CN2013/070305, filed Jan. 10, 2013, which is hereby incorporated by reference.

TECHNICAL FIELD

The present disclosure relates to the field of radio network, and more particularly, to a method, a Base Station (BS) and a User Equipment (UE) that is capable of enhancing network throughput by efficiently transmitting the E-DCH HARQ Acknowledgement Indicator Channel (E-HICH) information in the radio network.

BACKGROUND

In a typical cellular radio system, user equipments (UEs) communicate via a radio access network (RAN) to one or more core networks. FIG. 1 shows a schematic diagram of a Radio Network Subsystem (RNS) 100. The RNS 100 has a Radio Network Controller (RNC) 101. Each RNS 100 has one or more Node B 102 which are similar in function to a Base Transmitter Station of a Global System for Mobile communication (GSM) radio access network. UE 103 may be mobile within the radio access network. Radio connections (indicated by the straight dotted lines in FIG. 1) are established between the UE and one or more of the NodeBs in the UMTS Terrestrial Radio Access Network (UTRAN). The UE comprises various types of equipment such as mobile telephones (also known as cellular or cell phones), laptops with wireless communication capability, personal digital assistants (PDAs) etc. These may be portable, hand held, pocket sized, installed in a vehicle etc and communicate voice and/or data signals with the radio access network.

In recent years, portable terminals and smartphones are widely used, and there is a consistent desire for high-capacity data transfer using a portable communication network. In the network, UE transmits/retransmits uplink data according to acknowledgement (ACK) or Negative-acknowledgement (NACK) from a base station (BS) indicating success or fail of reception of the data. If the ACK/NACK cannot be transmitted normally, the network throughput will be reduced.

Therefore, there is a need to effectively enhance network throughput with a new ACK/NACK information transmission mechanism.

SUMMARY

An object of the present disclosure is to provide a method, a BS and a UE that is capable of enhancing network throughput by efficiently transmitting the E-HICH information in the radio network.

In an aspect of the disclosure, there is provided a method of transmitting E-HICH information. The method is performed when a transmission interval of previous E-HICH information fully overlaps with a compressed mode gap. The method comprises steps of combining previous E-HICH information with current E-HICH information and transmitting the combined E-HICH information in a transmission interval of the current E-HICH information.

According to the method, E-HICH information will be transmitted even if the transmission interval of the E-HICH information fully overlaps with a compressed mode gap. It is transmitted in a following transmission interval, which also contains E-HICH information that is intended to be transmitted in the transmission interval. That is, the previous E-HICH information is combined with the current E-HICH information and then transmitted. The user equipment will be configured to transmit uplink data even if it is determined that the E-HICH information of the uplink data will not be received before a next uplink transmission interval.

In another aspect of the disclosure, there is provided a base station of transmitting E-HICH information, comprising a combination unit configured to combine previous E-HICH information with current E-HICH information when a transmission interval of the previous E-HICH information fully overlaps with a compressed mode gap, and a transmission unit configured to transmit the combined E-HICH information in a transmission interval of the current E-HICH information.

According to the BS, the previous E-HICH information will be transmitted in the transmission interval of the current E-HICH information along with the current E-HICH information that is intended to be transmitted in the transmission interval.

In a further another aspect of the disclosure, there is provided a user equipment operable to communicate in a wireless communication network, comprising a reception unit configured to receive E-HICH information, and a decoder configured to decode the received E-HICH information. The decoder is configured to decode the received E-HICH information to obtain two pieces of E-HICH information, i.e., previous E-HICH information and current E-HICH information if it is determined that the transmission interval of the previous E-HICH information fully overlaps with the compressed mode gap.

According to the UE, it is aware that the previous E-HICH information will be transmitted along with the current E-HICH information from the BS when the previous E-HICH information cannot be transmitted in the intended transmission interval due to overlapping. The UE is configured to transmit uplink data even if it is determined that the E-HICH information of the uplink data will not be received before a next uplink transmission interval.

According to the disclosure, both the previous E-HICH information and the current E-HICH information will be received in the transmission interval of the current E-HICH information. Therefore, the network throughput is effectively enhanced.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Hereunder, the present disclosure will be described in accordance with the drawings. In the following description, some embodiments are used for the purpose of description only, which shall not be understood as any limitation to the present disclosure but the examples thereof. The terminology used herein is for the purpose of describing particular embodiments only, and is not intended to limit the invention. In the following description, reference will be made to particular standards. However it should be understood that the invention is not intended to be limited to any particular communication system or standard.

Figure 1:
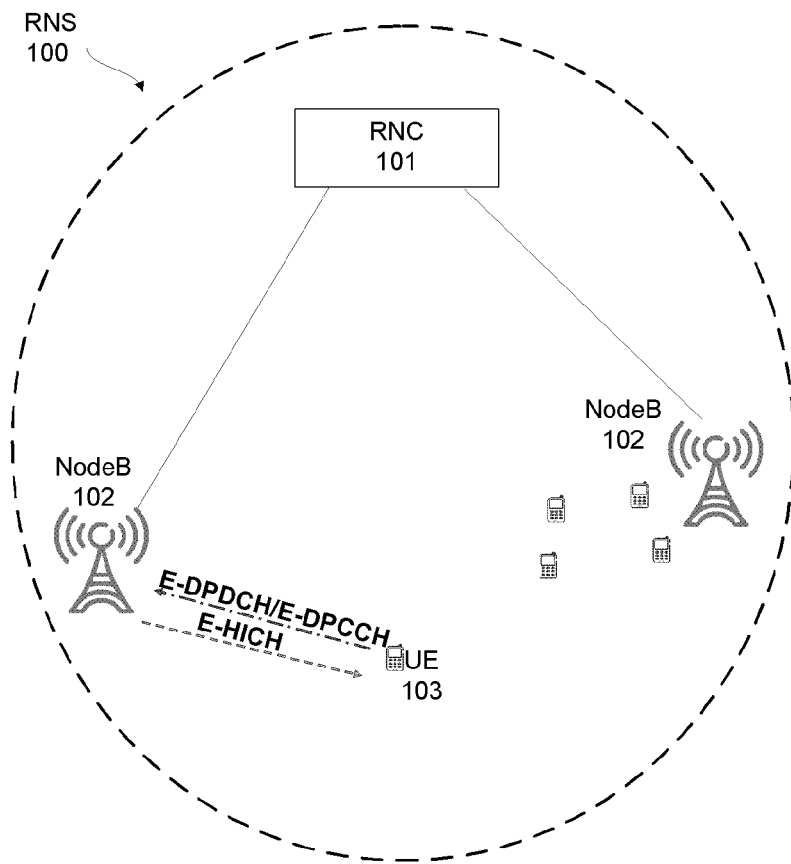
FIG. 1 shows a schematic diagram of a Radio Network Subsystem.
Figure 2:
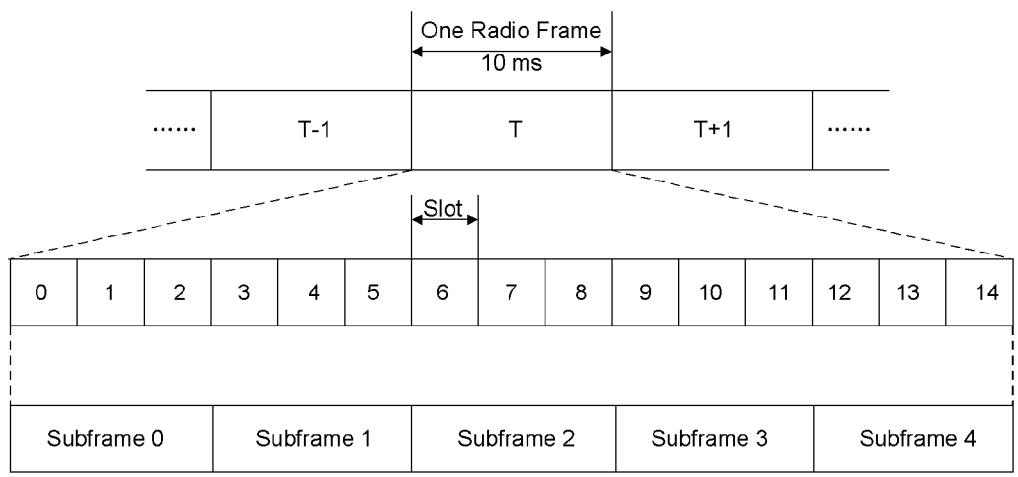
FIG. 2 shows a frame format in UMTS.

FIG. 2 shows a frame format in Universal Mobile Telecommunications System (UMTS). The timeline for transmission is divided into radio frames. Each radio frame has a duration of 10 milliseconds (ms) and is identified by a 12-bit system frame number (SFN) that is sent on a control channel. Each radio frame may also be identified by an 8-bit connection frame number (CFN) that is maintained by both the UE and the Node B that serves the UE. Each radio frame is partitioned into 15 slots, which are labeled as slot 0 to slot 14. Each slot has a duration of $T_{slot}$=0.667 ms and includes 2560 chips at 3.84 Mcps (mega chip per second). Each radio frame is also partitioned into five subframes 0 to 4. Each subframe has a duration of 2 ms and includes 3 slots.

UMTS supports a compressed mode on the downlink to provide gaps in transmission to allow a UE to make measurements for neighbor cells. Compressed mode is needed when making measurements on another frequency (inter-frequency, IF) or on a different Radio Access Technology (inter-RAT, IRAT). Inter-frequency measurements are performed between the channels of different frequencies within the same or a different UMTS band. Inter-RAT measurements are performed between the channels of different Radio Access Technologies (e.g. GSM and UMTS). In the compressed mode, transmission and reception by the UE's transceiver on the band the UE is camped on is stopped for a short time. The BS serving the UE does not transmit any data during the time. This time is called a Transmission Gap (TG), or Compressed Mode (CM) Gap. This allows the transceiver to be used to perform measurements on the other frequency. Once the measurement has been made, transmission and reception resume on the band the UE is camped on. Compressed Mode is the term used to define the method whereby the average data rate is maintained by compressing data in the frame either side of the transmission gap required for the measurement.

Figure 3:
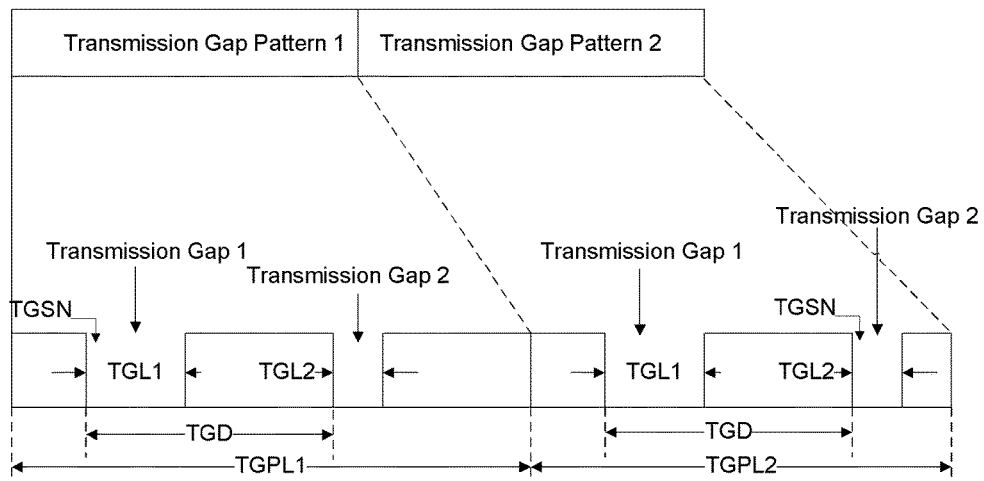
FIG. 3 shows the Transmission gap patterns1 and 2 for the compressed mode in UMTS.

FIG. 3 shows the Transmission gap patterns1 and 2 for the compressed mode in UMTS. In the compressed mode, user-specific data for the UE is transmitted in accordance with the Transmission gap pattern sequence, which may include alternating Transmission gap patterns 1 and 2. Each Transmission gap pattern includes one or more transmission gaps. Each Transmission gap may occur entirely within one radio frame or may span across two radio frames. The Transmission gap pattern sequence may be defined by the parameters given in Table 1.

TABLE 1

| SYMBOL | PARAMETERS | DESCRIPTION |
| --- | --- | --- |
| TGCFN | Transmission gap CFN | CFN of the first radio frame for transmission gap pattern 1 |
| TGSN | Transmission gap starting slot number | Slot number of the first transmission gap slot in each transmission gap pattern |
| TGL1 | Transmission gap length 1 | Duration of the first transmission gap in each transmission gap pattern |
| TGL2 | Transmission gap length 2 | Duration of the second transmission gap in each transmission gap pattern |
| TGD | Transmission gap distance | Duration between the starting slots of the first and second transmission gaps |
| TGPL1 | Transmission gap pattern length 1 | Duration of transmission gap pattern 1 |
| TGPL2 | Transmission gap pattern length 2 | Duration of transmission gap pattern 2 |

The CM patterns may be used for Received Signal Strength Indicator (RSSI) measurement, Initial Base transceiver Station Identity Code (BSIC) identification, or BSIC re-confirmation. The detailed definition comprises:

GSM RSSI measurements
  The UE shall perform GSM RSSI measurements in the gaps of compressed mode pattern sequence specified for GSM RSSI measurement purpose.
Initial BSIC identification
  The UE shall perform Initial BSIC identification in compressed mode pattern sequence specified for Initial BSIC identification measurement purpose.
BSIC re-confirmation
  The UE shall perform BSIC re-confirmation in compressed mode pattern sequence specified for BSIC re-confirmation measurement purpose.

The compressed mode is described in 3GPP TS 25.212, 25.213 and 25.215, all of which are publicly available and incorporated herein by reference.

Figure 4:
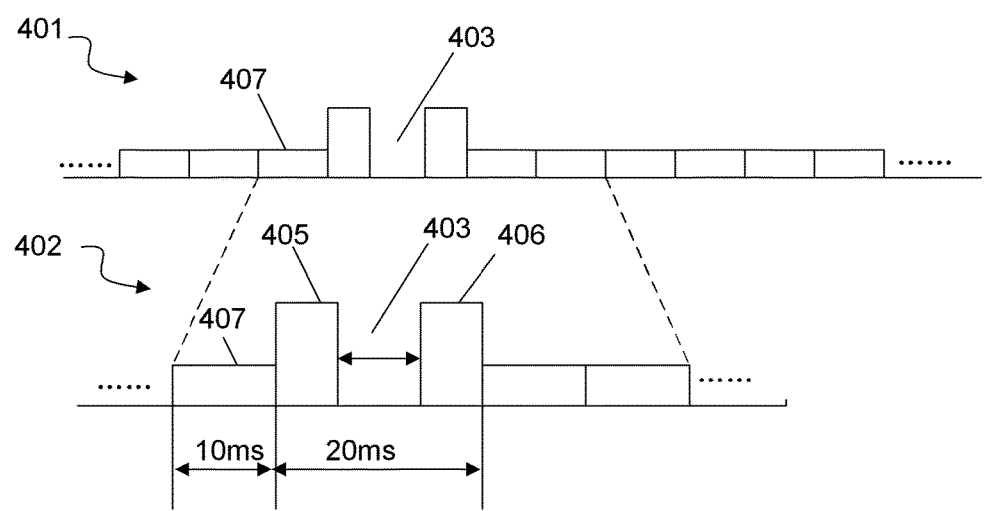
FIG. 4 illustrates downlink transmission in the compressed mode.

FIG. 4 illustrates downlink transmission in the compressed mode. Time is on the horizontal axis and instantaneous transmit power is on the vertical axis. In FIG. 4, one frame (e.g. 407) is shown as having a duration of 10 milliseconds (ms). Each frame comprises a plurality of slots. A series of frames 401 have compressed mode gap 403. A more detailed view 402 of five frames around the compressed mode gap 403 is also shown. The compressed mode gap shown in FIG. 4 is across two frames, which is called a two-frame compressed mode. Either side of the transmission gap 403 the instantaneous transmit power of the slots of the frame remaining (405, 406) for data transmission is increased in order to keep the quality of the communication link unaffected by the reduced time available for transmission. Examples of the measure of quality are Bit Error Rate (BER) and Frame Error Rate (FER), although any other appropriate measure of quality may be used. The size of the increase in instantaneous transmit power is dependent upon the transmission time reduction method.

3GPP specification defines sets of channels that enable high-speed packet data transmission on the downlink and uplink. Some physical channels involved herein comprise:

P-CCPCH (downlink): Primary Common Control Physical Channel, used for carrying pilot and SFN;

HS-SCCH (downlink): Shared Control Channel for HS-DSCH, used for carrying signaling for packets set on the HS-PDSCH;

HS-PDSCH (downlink): High Speed Physical Downlink Shared Channel, used for carrying packets sent on the downlink for different UEs;

E-DPCCH (uplink): E-DCH Dedicated Physical Control Channel, used for carrying signaling for the E-DPDCH;

E-DPDCH (uplink): E-DCH Dedicated Physical Data Channel, used for carrying packets sent on the uplink by a UE; and E-HICH (downlink): E-DCH Hybrid ARQ Indicator Channel, used for carrying ACK/NACK for packets sent on the E-DPDCH.

P-CCPCH is used directly as timing reference for the downlink physical channels and is used indirectly as timing reference for the uplink physical channels. The frame timing of E-HICH is offset by $\tau_{E\text{-}HICH,n}$ from the frame timing of the P-CCPCH, which is defined in 3GPP TS 25.211.

Figure 5:
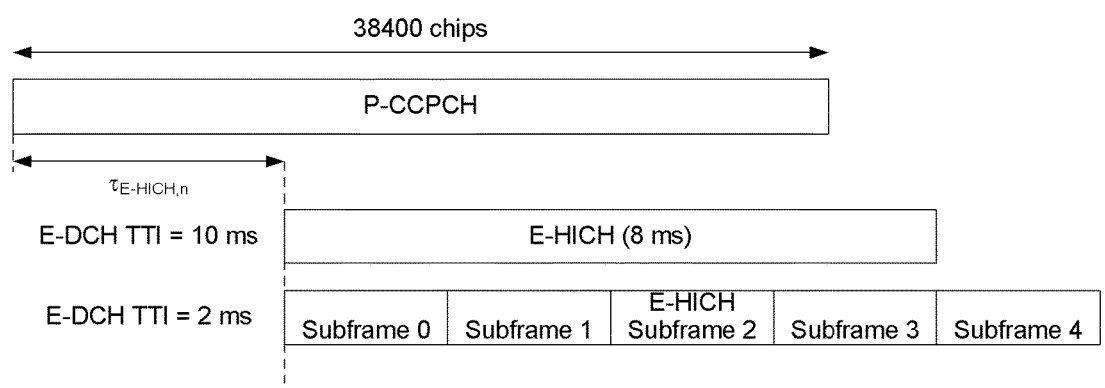
FIG. 5 shows the timing offset of E-HICH relative to P-CCPCH in TTI of 10 ms and TTI of 2 ms.

FIG. 5 shows the timing offset of E-HICH relative to P-CCPCH in transmission time interval (TTI) of 10 ms and TTI of 2 ms. When the TTI is 10 ms, $\tau_{E\text{-}HICH,n}$ is defined as $$\tau_{E\text{-}HICH,n} = 5120 + 7680 \times \left\lfloor \frac{(\tau_{DPCH,n}/256) - 70}{30} \right\rfloor.$$

E-DPCCH and E-DPDCH are time aligned and their frame timing is offset by $\tau_{DPCH,n}=256n$, and n can be in a range from 0 to 149. The frame timing of the downlink and uplink physical channels is described in 3GPP TS 25.211. For simplicity, other physical channels such as grant channels are not shown in FIG. 5. For each cell in the E-DCH active set, the UE shall associated the control data received in E-HICH frame associated with SFN i to the data transmitted in the E-DPDCH frame associated with SFN i–3.

In the network, The UE transmits uplink data to the BS on E-DPDCH in an uplink transmission interval. The BS sends an ACK or NACK on E-HICH, in response to correctly or incorrectly receive the uplink data transmitted from the UE. The UE will decide whether to retransmit the data in the following uplink transmission interval according to the E-HICH information received. When the transmission interval for the E-HICH fully overlaps with the CM gap, the BS will not transmit the E-HICH information at the intended transmission interval. The E-HICH information will be sent with a delay. The UE, thus, does not transmit/retransmit data in the uplink transmission interval because it is aware in advance that the E-HICH information for that data cannot be received. The UE does not transmit uplink data in the uplink transmission interval even though the UE can transmit the uplink data. Therefore, such mechanism of transmitting E-HICH decreases greatly the uplink throughput during the compressed mode.

For example, the compressed mode parameters may be configured as listed in Table 2.

TABLE 2

| CM PATTERN | TGPL1 | TGL1 | TGSN | TGD | TGL2 | TGCFN |
|---|---|---|---|---|---|---|
| IF | 8 | 14 | 8 | 0 | 14 | 1 |
| IRAT: RSSI | 24 | 14 | 8 | 0 | 14 | 4 |
| IRAT: Initial BSIC | 24 | 14 | 8 | 0 | 14 | 12 |
| IRAT: BSIC Re-confirmation | 24 | 14 | 8 | 0 | 14 | 20 |

A simulation result of transmission of the uplink data with the compressed mode parameters may be:

| TTI | DATA | ACK | TOTAL |
|---|---|---|---|
| 1 | 100% | OK | 100% |
| 2 | 50% | OK | 50% |
| 3 | 50% | NOK | 0% |
| 4 | 100% | OK | 100% |
| 5 | 50% | OK | 50% |
| 6 | 50% | OK | 50% |
| 7 | 100% | OK | 100% |
| 8 | 100% | NOK | 0% |

The throughput is around 56%:

(1+0.5+1+0.5+0.5+1)/8=4.5/8=0.56=56%.

Figure 6:
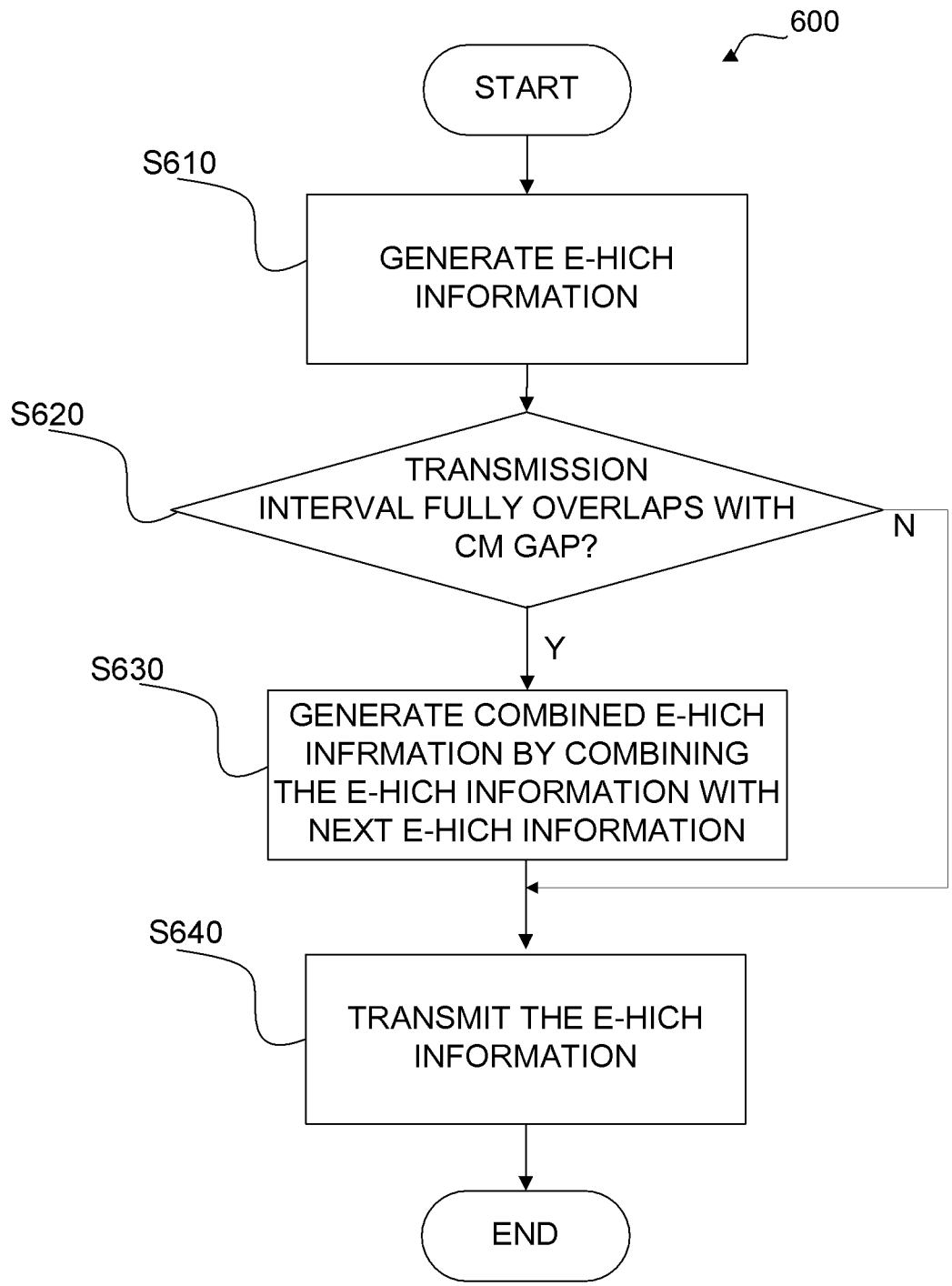
FIG. 6 is a flow chart of a method of transmitting E-HICH information according to an embodiment of the present disclosure.

FIG. 6 is a flow chart of a method 600 of transmitting E-HICH information according to an embodiment of the present disclosure. The method may be performed at the BS.

As shown in FIG. 6, the method starts and proceeds to step S610, where E-HICH information is generated at the BS. The step S610 may be in response to uplink data transmitted from a UE that is within the coverage of the BS. If the uplink data is correctly received, the generated E-HICH contains an ACK; otherwise, the generated E-HICH contains a NACK. In step S620, the BS determines whether the transmission interval of the E-HICH information fully overlaps with a CM gap. If the transmission interval does not overlap, or only partly overlaps with the CM gap, the method proceeds to step S640, where the BS transmits the E-HICH in the transmission interval normally or in compressed frames. If the transmission interval fully overlaps with the CM gap, the BS does not transmit the E-HICH information in the transmission interval and holds the E-HICH information until the transmission interval of next E-HICH information. In step 630, the BS combines the E-HICH information not transmitted due to overlapping and the next E-HICH information and generates combined E-HICH information. After that, the method proceeds to step S640, where the BS transmit the combined E-HICH information in the transmission interval of the next E-HICH information.

In the embodiment, the UE transmits new data even if it is determined that the transmission interval of the E-HICH corresponding to the new data will fully overlap the CM gap and thus the E-HICH will not be transmitted from the BS at the transmission interval. The term "fully overlap" used herein means "completely failing into." A transmission interval fully overlapping with a CM gap means that the transmission interval completely falls into the CM gap.

Figure 7:
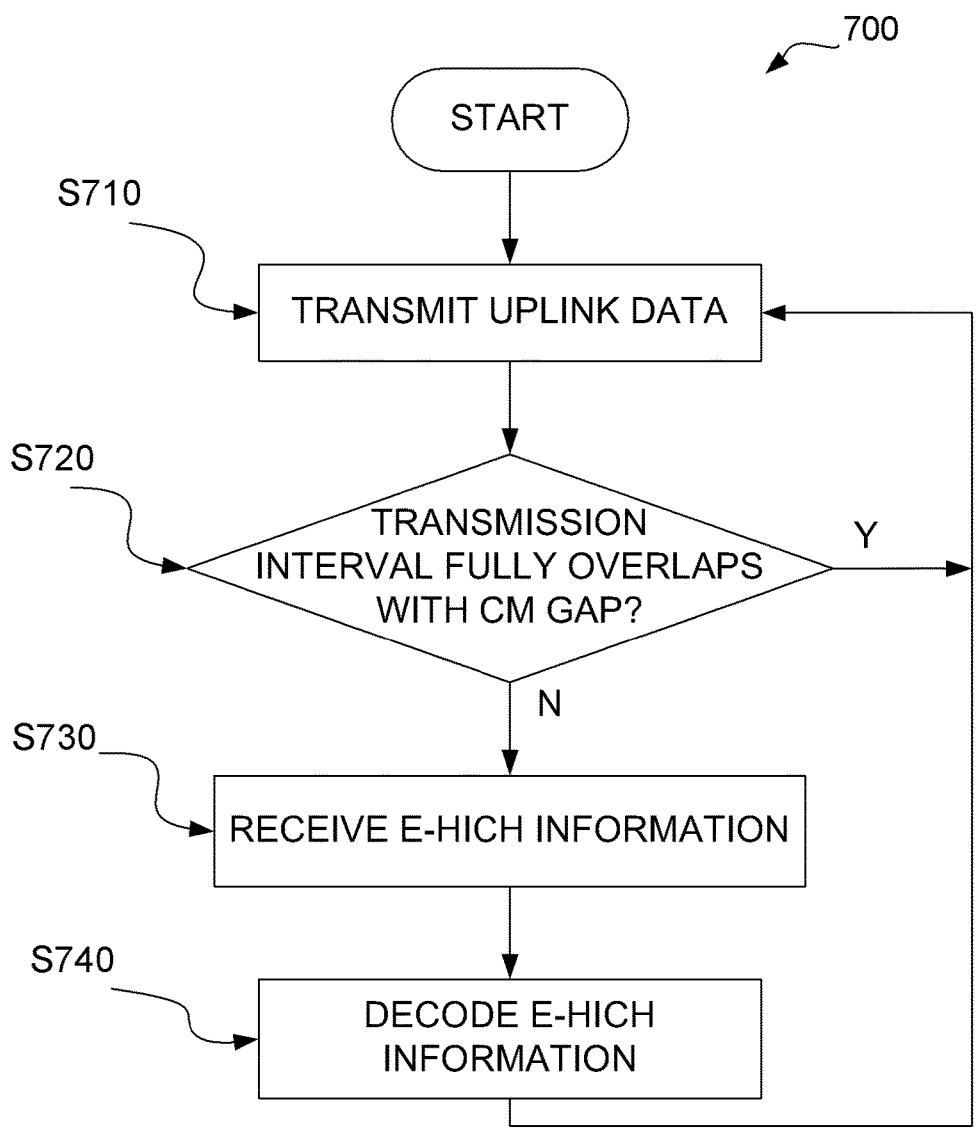
FIG. 7 is a flow chart of a process of communication of a UE according to an embodiment of the present disclosure.

FIG. 7 is a flow chart of a process 700 of communication of a UE according to an embodiment of the present disclosure.

The process starts at step S710 where the UE transmits uplink data in an uplink transmission interval. After that, the UE is waiting for reception of E-HICH information, indicating whether the uplink data is received correctly at the BS. If the UE determines that the transmission interval for that E-HICH information fully overlaps with a CM gap at step S720, it knows that BS does not transmit the E-HICH information. In such case, the process turns to step S710, where the UE transmits new uplink data in the following uplink transmission interval. Otherwise, the UE receives E-HICH information from the BS at step S730. After that, the UE decodes the received E-HICH information at step S740. If the UE knows that the previous E-HICH information is not received, it decodes the received E-HICH information to obtain the previous E-HICH information and the current E-HICH information. If the previous E-HICH information has been received, the received E-HICH information is decoded to obtain merely the current E-HICH information. Then, the process turns to step S710, where the UE transmits uplink data in the further following uplink transmission interval according to the previous E-HICH information and the current E-HICH information.

Figure 8:
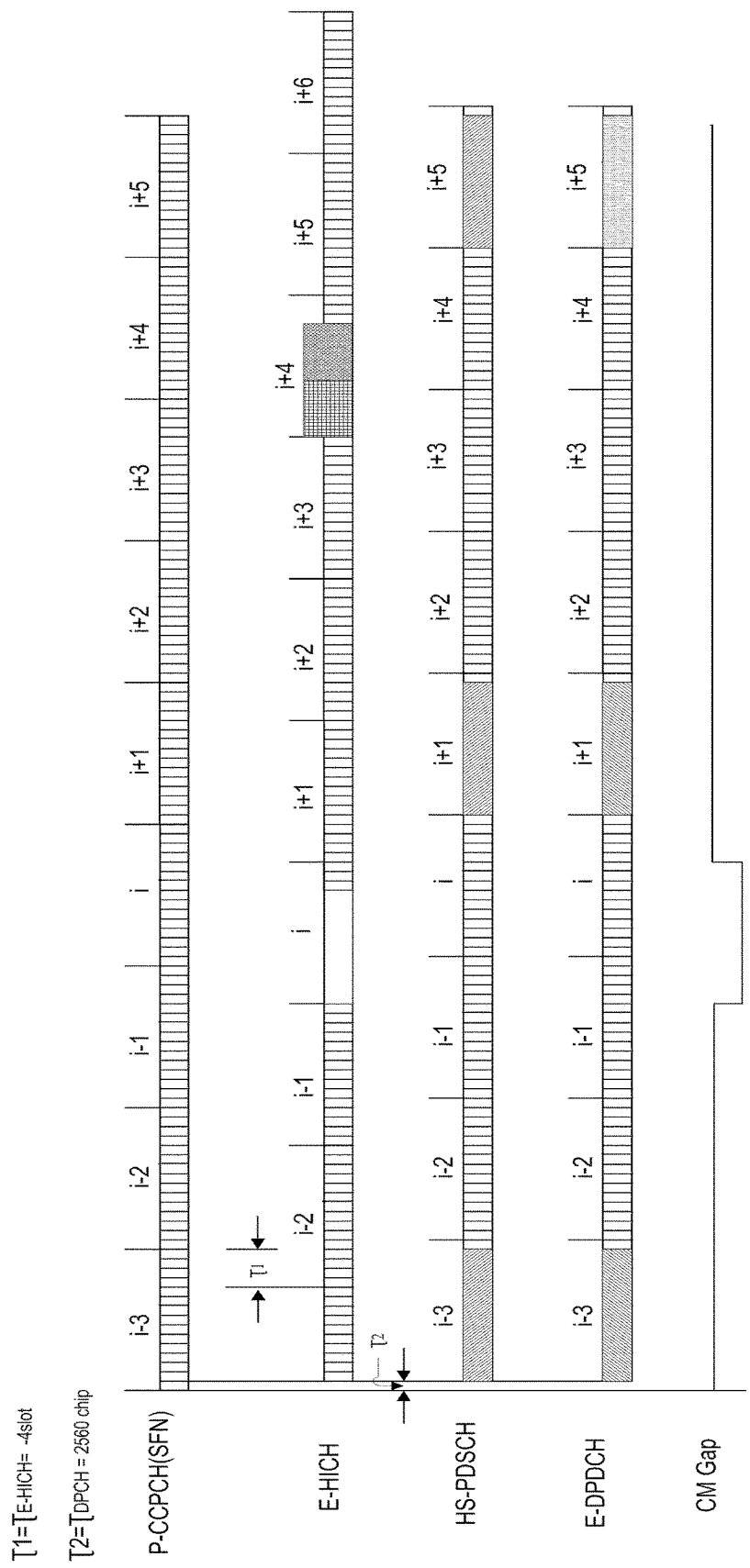
FIG. 8 shows a sequence diagram of E-HICH, HS-PDSCH, E-DPDCH according to the embodiment of the present disclosure.

FIG. 8 shows a sequence diagram of E-HICH, HS-PDSCH, E-DPDCH relative P-CCPCH according to the embodiment of the present disclosure.

In the embodiment, it is assumed that $\tau_{E\text{-}HICH,n}=-4$ slots and $\tau_{DPCH,n}=2560$ chips.

As shown, at SFN i−3, the UE transmits uplink data on E-DPDCH (shown with forward slashes) no matter whether or not the E-HICH for the E-DPDCH data will be transmitted from the BS. The BS generates the E-HICH information that contains ACK/NACK indicating the E-DPDCH data transmitted at SFN i−3 is correctly received or not. The BS shall transmit the E-HICH information at SFN i. However, the BS does not transmit the E-HICH information because the transmission interval of the E-HICH fully overlaps the CM gap (shown in blank). At SFN i+1, the UE transmits new data on E-DPDCH although no E-HICH information is received. The BS generates E-HICH information indicating whether the E-DPDCH data transmitted at SFN i+1 is correctly received or not. At SFN i+4, the BS combines the E-HICH corresponding to the data transmitted at SFN i−3 (hereunder "previous E-HICH") and the E-HICH corresponding to the data transmitted at SFN i+1 (hereunder "current E-HICH") as combined E-HICH and transmits to the UE (shown in matts). The UE receives the combined E-HICH, and decodes it to obtain the previous E-HICH and the current E-HICH. At SFN i+5, the UE determine how to transmit data according to the previous E-HICH and current E-HICH. There are four cases as follows:

1. The UE transmits new uplink data at SFN i+5 if the previous and current E-HICH information indicates that the data transmitted at SFN i−3 and SFN i+1 are correctly received at the BS.
2. The UE retransmits at SFN i+5 the data transmitted at SFN i−3 if the previous E-HICH information indicates that the data transmitted at SFN i−3 is not correctly received while the current E-HICH information indicates that the data transmitted at SFN i+1 is correctly received, and maximum retransmission number for the data transmitted at SFN i−3 is not reached.
3. The UE retransmits at SFN i+5 the data transmitted at SFN i+1 if the previous E-HICH information indicates that the data transmitted at SFN i−3 is correctly received while the current E-HICH information indicates that the data transmitted at SFN i+1 is not correctly received, and maximum retransmission number for the data transmitted at SFN i+1 is not reached.
4. The UE retransmits at SFN i+5 the data transmitted at SFN i−3 if the previous E-HICH information indicates that the data transmitted at SFN i−3 is not correctly received and the current E-HICH information indicates that the data transmitted at SFN i+1 is also not correctly received, and maximum retransmission number for the data transmitted at SFN i−3 is not reached.

The general rule is that data staying in the transmission buffer longer will be sent firstly with the precondition that maximum retransmission number of that data is not reached.

The normal E-HICH information is transmitted within a transmission interval with a predefined E-HICH transmission power. As shown, the combined E-HICH information contains two pieces of E-HICH information. The previous E-HICH occupies the first n slots of the transmission interval (shown in the left in the interval of SFN i+4) and the current E-HICH occupies the remaining 12−n slots of the transmission interval (shown in the right in the interval of SFN i+4), n being an integer in the range of 1 to 11. In a preferable example, it is taken n=6. In such case, the two pieces of E-HICH information occupy the same number of slots in the combined information. Accordingly, the BS may employ a simple compression algorithm to generate the combined information. In order to maintain the same decoding quality as the normal E-HICH information, the combined E-HICH is transmitted with p times of the predefined E-HICH transmission power. In the embodiment, it is taken p=2. It can be recognized that the transmission power of the combined E-HICH is not limited to 2 times of the E-HICH transmission power. Any other appropriate criteria can be applied to determine the value of n and the transmission power. It should be understood that any other combination of two pieces of information is applicable as long as the intended UE is capable of correctly decoding the two pieces of E-HICH information from the combined information. For example, the two pieces of information may be interleaved in the combined information.

Figure 9:
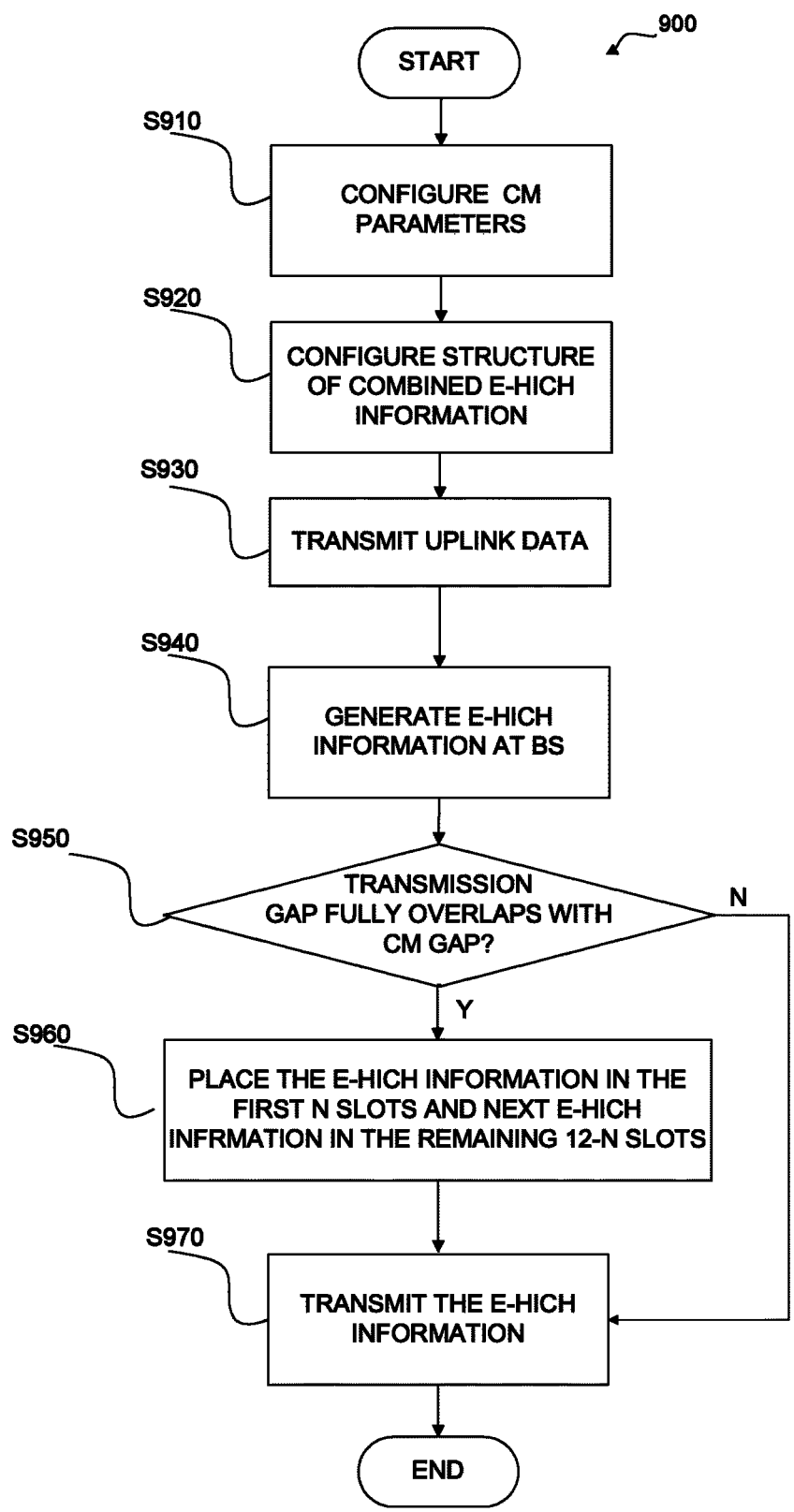
FIG. 9 is a flow chart of a method of transmitting E-HICH information according to another embodiment of the present disclosure.

FIG. 9 is a flow chart of a method 900 of transmitting E-HICH information according to another embodiment of the present disclosure. At the beginning, the RNC configures and informs the BS and the UE the compressed mode parameters at step S910, so that the BS and the UE will determine the compressed mode to be applied during operation. Then, in step S920, the RNC shall provision the structure of combined E-HICH information and inform the BS and UE so that they can cooperate with each other correctly. Steps S910 and S920 may be performed at the link establish stage when the UE attaches to the BS. As an alternative, the combined E-HICH information may have a predefined and fixed structure that is known to the BS and UE. In such case, step S920 may be skipped. After the link between the UE and the BS establishes, UE transmits uplink data to the BS at step S930. In step S940, the BS generates E-HICH information containing ACK or NACK which depends on whether the data is received correctly or nor at the BS. In step S950, the BS determines whether the E-HICH can be transmitted. By using the CM parameters, the BS can determine the CM gap. Comparing the transmission interval for the E-HICH and the CM gap, the BS determines whether the transmission interval fully overlaps the CM gap. If the transmission interval does not overlap, or partly overlaps with the CM gap, the method proceeds to step S970, where the BS transmits the E-HICH in the transmission interval normally or in compressed frames. If the transmission interval fully overlaps with the CM gap, the BS does not transmit the E-HICH information in the transmission interval and holds the E-HICH information until the transmission interval of next E-HICH information. In step 960, the BS generates combined E-HICH information by placing the E-HICH information not transmitted due to overlapping in first n slots of the transmission interval and the next E-HICH information in the remaining 12-n slots. After that, the method proceeds to step S970, where the BS transmit the combined E-HICH information in the transmission interval of the next E-HICH information with p times of the predefined E-HICH transmission power.

Figure 10:
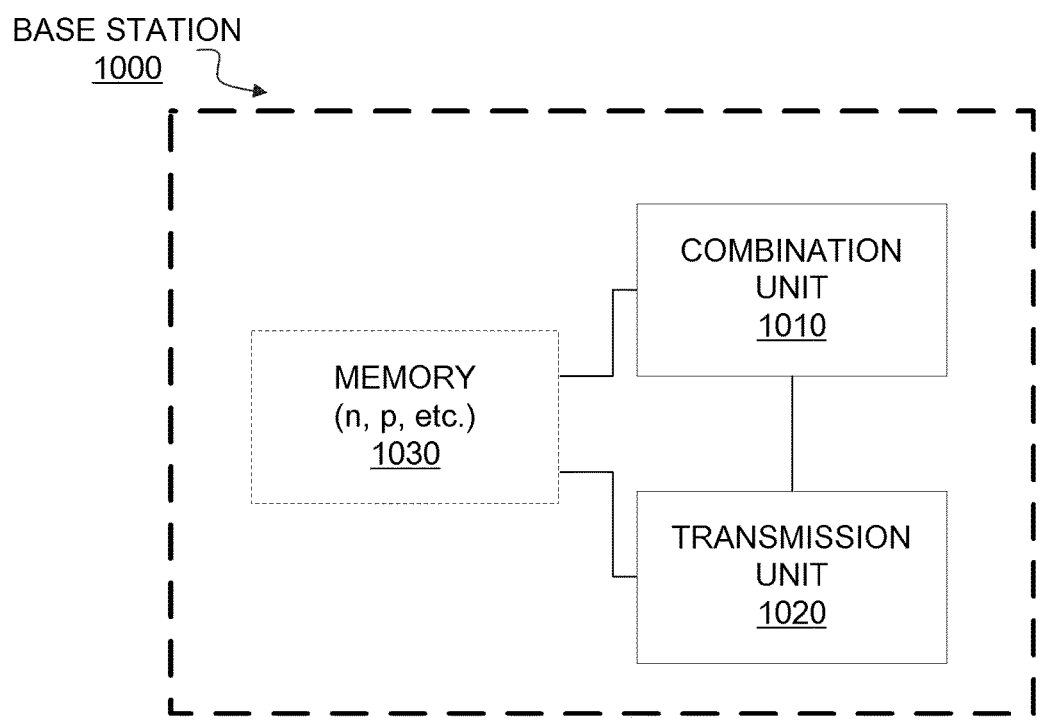
FIG. 10 shows a block diagram of a base station according to an embodiment of the present disclosure.

FIG. 10 shows a block diagram of a base station 1000 according to an embodiment of the present disclosure. As shown, the base station 1000 comprises a combination unit 1010 and a transmission unit 1020. The transmission unit 1020 is configured to transmit to UE data including controlling data and packet data. When the BS receives uplink data from a UE, it generates E-HICH information indicating whether the uplink data is correctly received or not. It then determines whether the generated E-HICH information can be transmitted. That is, it determines whether the transmission interval of the E-HICH information fully overlaps with a compressed mode gap. If yes, it holds the E-HICH information until the transmission interval of next E-HICH information. The combination unit 1010 is configured to combine the E-HICH information not transmitted due to overlapping with the next E-HICH information. The transmission unit 1020 is configured to transmit the combined E-HICH information in the transmission interval of the next E-HICH information. There is also provided a memory 1030 in the base station 1000 for storing various parameters, such as the compressed mode parameters and the information on combination of E-HICH information. Based on the stored compressed mode parameters, the BS determines the compressed mode gap and whether the E-HICH information can be transmitted. Based on the information on combination of E-HICH information, such as the value of p and n, the BS can correctly combines two pieces of E-HICH information and transmit to UE.

Figure 11:
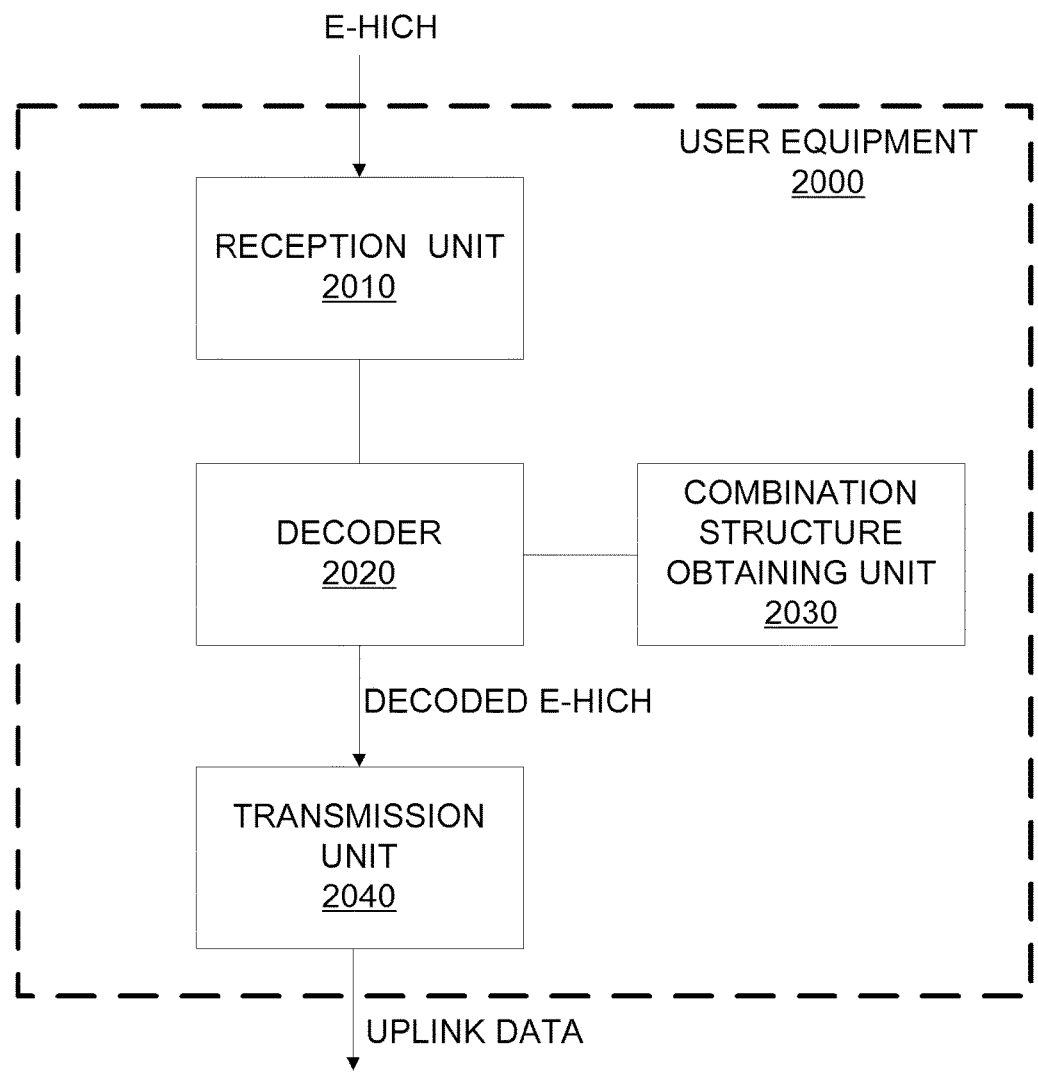
FIG. 11 shows a block diagram of a user equipment according to an embodiment of the present disclosure.

FIG. 11 shows a block diagram of a user equipment (UE) 2000 according to an embodiment of the present disclosure. As shown, the user equipment 2000 comprises a reception unit 2010 configured to receive E-HICH information from the BS, and a decoder 2020 configured to decode the received E-HICH information. If the user equipment determines that a transmission interval of previous E-HICH information fully overlaps with a compressed mode gap and the reception unit 2010 does not receive the previous E-HICH information at the intended time, the user equipment knows that the currently received E-HICH information contains two pieces of E-HICH information, i.e., the previous E-HICH and the current E-HICH. In such case, the decoder is configured to decode the received E-HICH information by means of information on combination of E-HICH, to obtain the previous and current E-HICH information.

The user equipment further comprises a combination structure obtaining unit 2030 configured to obtain knowledge of structure of combined E-HICH information, so that the decoder 2020 correctly decodes the combined E-HICH information. As said above, the combined E-HICH information may have a predefined and fixed structure that is known to the base station and the user equipment. In such case, the combination structure obtaining unit 2030 may be omitted.

The user equipment may further comprises a transmission unit 2040 configured to transmit uplink data according to the decoded E-HICH information. The transmission unit 2040 is configured to transmit new uplink data if the previous E-HICH information is not received from the base station. In the embodiment, the missing E-HICH information will be received later along with the following E-HICH information. Accordingly, such configuration will enhance the network uplink throughput without causing any trouble. When the combined E-HICH information is received, the transmission unit 2040 transmits uplink data based on the previous and current E-HICH information. If the previous and current E-HICH information indicates that data is correctly received, the transmission unit 2040 transmits new uplink data. If one of the previous and current E-HICH information indicates that data is not correctly received, the transmission unit 2040 retransmits the data not correctly received when the maximum retransmission number of the data is not reached. If both the previous and current E-HICH information indicates that the data is not correctly received, the transmission unit 2040 retransmits the data corresponding to the previous E-HICH information first when the maximum retransmission number of the data is not reached.

If the same compressed mode parameter listed in Table 2 are configured, and the mechanism of transmitting E-HICH according to the present disclosure is used, the simulation result of transmission of the uplink data with the compressed mode parameters may be:

| TTI | DATA | ACK | TOTAL |
| --- | --- | --- | --- |
| 1 | 100% | OK | 100% |
| 2 | 50% | OK | 50% |
| 3 | 50% | OK | 50% |
| 4 | 100% | OK | 100% |
| 5 | 50% | OK | 50% |
| 6 | 50% | OK | 50% |
| 7 | 100% | OK | 100% |
| 8 | 100% | OK | 100% |

The throughput is around 75%:

$$(1+0.5+0.5+1+0.5+0.5+1+1)/8=6/8=0.75=75\%.$$

Comparing with the result of the prior art, the throughput improvement is: $(0.75-0.56)/0.56=0.34=34\%$. The end user will have good uplink enhanced uplink (EUL) experience.

The invention is not limited to the examples of embodiments described above and shown in the drawings, but may be freely varied within the scope of the appended claims. In addition, although the invention has been described throughout above as being applied in a UMTS system, it should be understood that the invention can also be applied in other systems, such as, for example, an Evolved Universal Mobile Telecommunications System (E-UMTS) evolved from a UMTS, Long Term Evolution (LTE) system or LTE-Advanced (LTE-A) system, and other systems where the problems addressed by the invention may arise.

The foregoing description gives only the exemplary embodiments of the present disclosure and is not intended to limit the present disclosure in any way. Thus, any modification, substitution, improvement or like made within the scope and principle of the present disclosure should be encompassed by the embodiments of the present disclosure.

What is claimed is:

1. A method of transmitting E-DCH HARQ Acknowledgement Indicator Channel (E-HICH) information, comprising:
   receiving uplink data from a user equipment (UE) during a first uplink transmission interval;
   generating the E-HICH information containing an Acknowledgement (ACK) or Negative-Acknowledgement (NACK) in response to receiving the uplink data correctly or incorrectly;
   determining whether a first downlink transmission interval, for transmitting a downlink communication to the UE to transmit the E-HICH information, fully overlaps a compressed mode (CM) gap;

when the first downlink transmission interval does not fully overlap the CM gap, transmitting the E-HICH information in the downlink communication to the UE during the first downlink transmission interval; and when the first downlink transmission interval does fully overlap the CM gap:
- waiting to receive uplink data from the UE during a second uplink transmission interval and not transmitting the E-HICH information in the downlink communication to the UE during the first downlink transmission interval;
- generating a current E-HICH information containing a subsequent ACK or NACK in response to receiving the uplink data during the second uplink transmission interval;
- combining previous E-HICH information with current E-HICH information by placing the previous E-HICH information in first n slots and current E-HICH information in slots following the n slots of a second downlink transmission interval used for transmitting the current E-HICH information; and
- transmitting the combined E-HICH information in a downlink communication to the UE during the second downlink transmission interval.

2. The method according to claim 1, wherein the combining the previous E-HICH information with the current E-HICH information further comprises:
- placing the previous E-HICH information in first n slots of the second downlink transmission interval and the current E-HICH information in remaining 12−n slots of the second downlink transmission interval, where n being an integer in a range of 1 to 11.

3. The method according to claim 2, wherein n is 6.

4. The method according to claim 1, wherein the combined E-HICH information is transmitted by p times of E-HICH transmission power, p being larger than 1.

5. The method according to claim 4, wherein p is 2.

6. The method according to claim 1, wherein the UE receiving the combined E-HICH information decodes it to obtain the previous and current E-HICH information, and transmits further uplink data according to the previous and current E-HICH information in a following uplink transmission interval.

7. The method according to claim 6, wherein the UE transmits new uplink data in the second uplink transmission interval if it does not receive the previous E-HICH information in the first downlink transmission interval.

8. The method according to claim 6, wherein if the previous and current E-HICH information indicate that uplink data corresponding to the previous and current E-HICH information is correctly received, the UE transmits new uplink data in the following uplink transmission interval.

9. The method according to claim 6, wherein if the previous E-HICH information indicates that the uplink data corresponding to the previous E-HICH information is correctly received while the current E-HICH information indicates that the uplink data corresponding to the current E-HICH information is not correctly received, the UE transmits in the following uplink transmission interval the uplink data corresponding to the current E-HICH information if maximum retransmission number for the uplink data corresponding to the current E-HICH information is not reached.

10. The method according to claim 6, wherein if the previous E-HICH information indicates that the uplink data corresponding to the previous E-HICH information is not correctly received while the current E-HICH information indicates that the uplink data corresponding to the current E-HICH information is correctly received, the UE transmits in the following uplink transmission interval the uplink data corresponding to the previous E-HICH information if maximum retransmission number for the uplink data corresponding to the previous E-HICH information is not reached.

11. The method according to claim 6, wherein if the previous E-HICH information indicates that the uplink data corresponding to the previous E-HICH information is not correctly received and the current E-HICH information indicates that the uplink data corresponding to the current E-HICH information is also not correctly received, the UE transmits in the following uplink transmission interval the uplink data corresponding to the previous E-HICH information if maximum retransmission number for the uplink data corresponding to the previous E-HICH information is not reached.

* * * * *